Dec. 21, 1926.                                                              1,611,441
G. H. HIGGINS
GAUGE FOR PISTON RINGS
Filed March 21, 1925
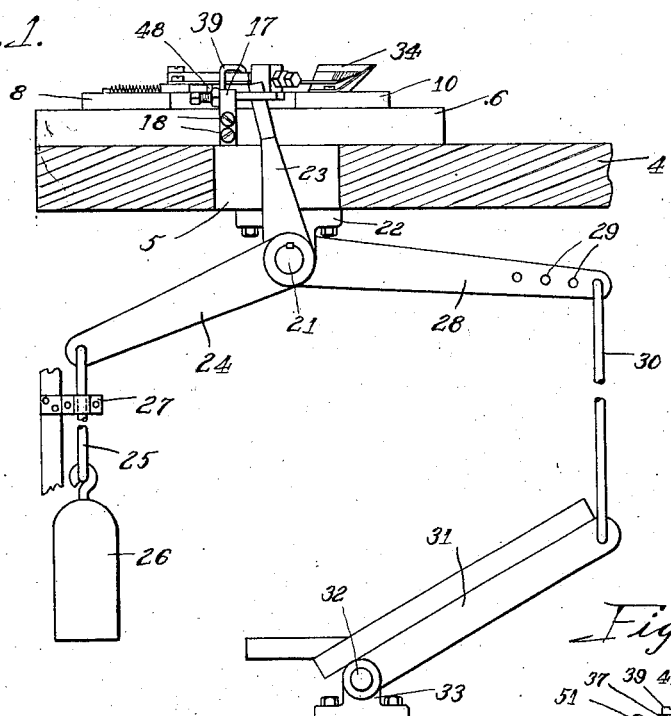
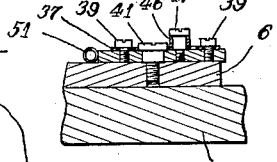
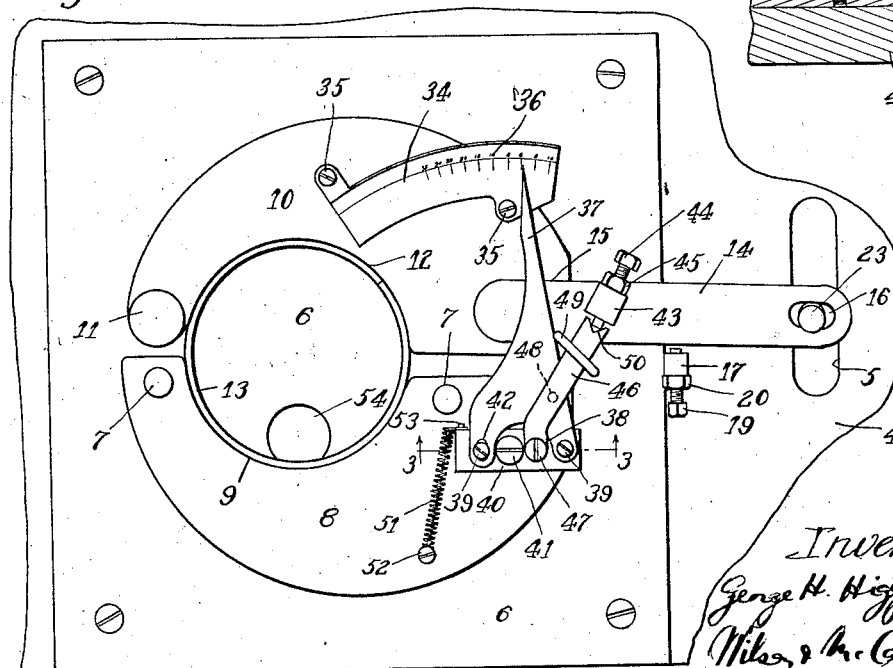

Patented Dec. 21, 1926.

1,611,441

UNITED STATES PATENT OFFICE.

GEORGE H. HIGGINS, OF ROCKFORD, ILLINOIS, ASSIGNOR TO BURD HIGH COMPRESSION RING COMPANY, OF ROCKFORD, ILLINOIS, A CORPORATION OF ILLINOIS.

GAUGE FOR PISTON RINGS.

Application filed March 21, 1925. Serial No. 17,165.

This invention relates to devices for accurately determining or gauging the sizes, that is, the diameter and circumference of cylindrical or annular objects such as piston rings.

Heretofore, no satisfactory means has been provided for quickly and accurately gauging annular objects such as piston rings, so that the rings could be classified or graded according to the size or gauge thereof. Piston rings are usually split and normally resiliently expanded with the ends separated, thereby requiring considerable pressure to move the ends together and into abutting relation to contract the ring to normal size or position in which its gauge can be determined. Therefore, the gauging of piston rings presents some difficulties and the use of a permanent or fixed gauge necessarily renders the gauging of piston rings slow, tedious and expensive.

The present invention provides a novel, simple and practical means for gauging piston rings and the like to detect inaccuracy and determine whether they are under size or over size within one or more thousandths of an inch, so that the rings can be graded and assorted into lots according to the size and uses thereof and to fit standard sizes of pistons and cylinders.

The invention also provides a gauge for piston rings adapted to being operated by foot power or otherwise, and which includes stationary and movable jaws, the movable jaw swinging into and out of operative or gauging position and actuating a pointer which cooperates with calibrations on a scale or dial plate, which calibrations or graduations are designed to indicate variations in size of thousandths of an inch or other standard scale measurement above and below normal. In practice the movable jaw is moved out of gauging position by pressure on a foot treadle to separate the jaws for receiving a ring and after the ring is inserted, the pressure is released to permit the jaw to move into operative position toward the stationary jaw for compressing the ring to normal size whereby the gauge of the ring may be determined. This pressure is applied by a weight or other pressure-exerting means, thereby relieving the operator of the expenditure of energy required in compressing the rings and permitting the rings to be quickly, accurately and economically gauged, thereby facilitating quantity production.

Other objects and attendant advantages will be appreciated by those skilled in this art as the invention becomes better understood by reference to the following description when considered in connection with the accompanying drawings, in which—

Figure 1 is a side elevation of the novel gauge with the support or table thereof in section.

Fig. 2 is a plan view of the device; and

Fig. 3 is a fragmentary vertical sectional view taken on the line 3—3 of Fig. 2.

Referring to the drawings in detail wherein I have illustrated an embodiment of the invention and in which similar reference characters designate corresponding parts throughout, 4 designates a horizontal support or table for the gauge proper and which is provided with an elongated transverse vertical slot 5 therethrough. Mounted upon the horizontal support or table is a bed-plate 6 preferably of metal and suitably anchored in position at the front edge of the table. Fixed upon the plate 6 at a plurality of points as shown at 7, is a flat stationary jaw 8, said jaw being provided with a concaved or semi-circular recess 9. Opposing the stationary jaw 8 is a flat pivoted or swinging jaw 10 movable on the pivot 11 and having a corresponding recess 12 opposed to the recess 9 and mating therewith to form a circular depression or seat for accommodating a cylindrical object such as a piston ring 13.

Fixed to the movable jaw 10 at its free end and extending longitudinally outward therefrom is an arm or extension 14, which is shown in the present instance as secured in a recess 15 in the jaw 10 and provided with a longitudinal slot 16 near its extremity. The arm 14 is limited in its forward movement by a stop member including a bracket 17 secured to the adjacent edge of the plate 6 as indicated at 18 in Fig. 1 and having a threaded aperture receiving an adjustable set or stop screw 19 therethrough adapted to be held in fixed position by a lock nut 20. The stop screw engages the edge of the arm 14, and thereby limits the closing movement of the movable jaw 10 toward the stationary jaw 8.

In order to swing the jaw 10 a shaft 21 is horizontally journaled in hangers or bearings 22 hung from the bottom of the table and has a rocker arm 23 fixed thereon extending up through the slot 5 and into the opening or slot 16 in the arm 14. An arm 24 is also fixed to the shaft 21 and extends forwardly and downwardly beneath the table and from its free end, a link or rod 25 is pivotally hung to suspend a weight 26 or other pressure-exerting means at its free end. The rod 25 may be guided in its vertical movements as indicated at 27 to prevent the rod and weight from wabbling or swinging to and fro. A rearwardly extending arm 28 is also fixed to the shaft 21 and has adjustable connection through a series of openings 29 and a link 30 with the free upper end of a foot treadle 31 pivoted at 32 in bearings 33 supported upon the floor. In this manner, the weight 26 will normally swing the arm 14 and jaw 10 to a forward position to coact with the stationary jaw for gauging purposes as shown in Fig. 2 of the drawings. The treadle 31 will thus normally be elevated and by applying pressure to the treadle, the shaft 21 will be rocked to swing the arm 23 rearwardly against the action of the weight to move the jaw 10 to an inoperative position away from the stationary jaw 8, that is, to separate the jaws. This movement may be adjusted by changing the position of the link 30 in the openings 29 of the arm 28.

A scale plate or dial 34 of arcuate formation is secured upon the movable jaw 10 as indicated at 35 and has graduations or calibrations 36 arcuately arranged and so spaced as to indicate the normal size or gauge of the piston ring to be tested, and variations in under size and over size at either side thereof, within one or more thousandths of an inch or other suitable standard scale measurement which may be used for this purpose.

A pointer or finger 37 cooperates with the calibrations of the dial 34 and has its forward end bifurcated as indicated at 38, the furcations being apertured so that the pointer may be secured as indicated at 39 to a plate 40 pivoted intermediately as shown at 41 to the stationary jaw 8. One of the apertures is made in the form of a slot 42 so that the pointer may be adjusted to give a proper scale indication.

A bracket or block 43 projects up from the arm 14 and receives an adjustable contact screw 44 which may be held in adjusted position by a lock nut 45. A contact arm 46 is pivoted at 47 to the plate 40 outwardly of its pivot 41, and a stop 48 in the form of a pin projecting upwardly from the jaw 8, limits the movement of the plate 40. The arm 46 extends outwardly or diagonally rearwardly for movement beneath an overhanging guide 49 secured to the plate 6.

The rear or free end of the arm 46 contacts with the screw 44 and is provided with a V-shaped recess 50 to insure engagement of the screw therewith and a positive thrust on the arm and pointer when the arm 14 is swung forwardly under the action of the weight 26 to move the jaw 10 to a closed or operative position with respect to the jaw 8 to close and gauge the ring as will be more fully set forth. The pointer is normally held in an inoperative position or to the left in Fig. 2 as by means of a contractile tension spring 51 anchored at one end as indicated at 52, to the stationary jaw 8, and at its other end to the pivoted plate 40, as indicated at 53, so as to rock the plate 40 on its pivot 41, limited by engagement with the stop 48. At the same time, the pointer 37 will be swung to the left and the arm 46 operating in the guide 49 will maintain its angular position by reason of its pivotal connection at 47 with the plate 40. A finger-receiving opening 54 is provided in the support 4 adjacent the edge of the recess 9 and at the front of the ring-receiving seat, to accommodate a finger of the operator to facilitate removal of the rings as they are gauged.

In the use and operation of the device for gauging piston rings, the weight 26 normally holds the movable jaw 10 toward the stationary jaw 8. The dial or scale plate 34 having been calibrated by the insertion of rings between said jaws after gauging the rings in the usual fixed gauges, each consisting of a plate having circular openings therein of the proper size or otherwise, the device is ready to be operated. The operator is reposed upon a seat positioned in front of the table 4 with one foot upon the treadle 31. The latter is depressed against the action of the weight 26 to swing the arm 23 rearwardly in the slot 5, and with it the movable jaw 10, through the medium of the extension or arm 14 with which the arm 23 has operative connection at the slot 16. The slot 16 compensates for the movement of the arm 14 in an arc on the pivot 11, thus permitting the arm 23 to move in a straight path. With this movement of the arm 23, the screw 44, is disengaged from the arm 46 and moves rearwardly, thus releasing the pressure of the weight on the arm 46, plate 40 and, pointer 37 which normally holds the pointer to the right as shown in Fig. 2, against the action of the spring 51. The spring is then free to exert its tension on the plate 40 at the rear left hand corner thereof to swing the plate 40 on its pivot 41 and move the pointer 37 over the dial to the left or non-registering position. During this movement, the arm 46 will swing with the plate 40 and will move rearwardly through the guide 49. The operator, with a quantity of the rings within easy reach, places or drops a ring between the separated jaws 8 and 10. The rings readily accommodate themselves to the seat or depression formed by the coacting recesses 9 and 12 and after pressure is released from the foot treadle 31, the weight 26 acts to swing the parts in the opposite direction from that previously described, causing the jaw 10 to move toward the jaw 8 and compress or contract the ring, such as 13, under considerable pressure. The ends of the ring are brought together and according to the extent of movement of the jaw 10 toward the jaw 8, the pointer 37 moves over the dial and indicates the exact size of the ring being acted upon. When pressure is released from the treadle 31 and the weight 26 acts, the arm 23 is swung forwardly as shown in Figs. 1 and 2 thus swinging the jaw 10 and arm 14 forwardly on the pivot 11. With this movement of the arm 14, the screw 44 carried by the bracket 43 will engage in the V-shaped recess 50 of the arm 46 and exert forward pressure on the latter to rock the plate 40 on its pivot 41 against the action of the spring 51, whereby the pointer is moved over the calibrations of the dial 34 and will indicate exactly the size or gauge of the ring. If the ring is of the proper size, the pointer will register with the zero mark and if over size, the ring will prevent the jaw 10 closing to the same degree and will be held to the left of the zero mark or calibration and indicate in thousandths of an inch, the exact over size measurement. If the ring should be under size, the jaw 10 will move further into closing position and the dial will swing beyond the zero mark to the right and indicate under size in the same manner. This operation is continued, the rings being dropped into the seat between the jaws and removed after being gauged and hung upon suitable racks or otherwise assorted and classified according to the gauge thereof. The operation may be quickly carried on with a minimum expenditure of time and labor, and is such as to greatly reduce the cost as compared with the cost in accordance with the old method as previously practiced. Furthermore, the machine is very simple and compact so that it can be readily applied to a table or work bench in the manner disclosed and lends itself to easy and convenient operation. Since the jaws are separated by depressing the treadle 31 by means of the foot pressure, both hands are free to handle the rings, thus expediting the work. The movement of the arm 14, and the jaw 10 as limited by the screw 19, may be adjusted by turning the screw in the bracket 17. Furthermore, the calibrations of the dial 34 and the accurate registration of the pointer 37 therewith may be insured by adjustment of the contact screw 44 whereby the proper movement will be imparted to the pointer through the inter-connected parts including the arm 46 and the plate 40. The pin 48 prevents the plate 40 from moving to or beyond a dead center position under the action of the spring 51 when the arm 14 is swung rearwardly to disengage the contact 44 from the arm 46, thus preventing the pointer from moving to a position where it will be locked or require manual setting.

While I have described what I now consider to be the preferred embodiment of the invention, it is to be understood that the device is susceptible of wide changes and variations in the construction, arrangement and purposes of the parts as well as the materials used, without departing from the spirit and scope of the invention as will be hereinafter defined in the claims.

I claim:

1. In a gauge for piston rings, jaws having coacting recesses forming a ring-receiving seat, a manually operated part for separating the jaws, another part capable of exerting a predetermined force for moving the jaws together to cause the ends of the rings to move together, and means coöperative with the jaws and actuated thereby to indicate the gauge of the ring.

2. In a gauge for piston rings, jaws having coacting recesses forming a ring-receiving seat, means for separating and closing the jaws, a dial plate carried by one jaw, a pointer cooperating with the plate, and operative connections between a jaw and the pointer to shift the latter whereby to indicate the gauge of the ring held between the jaws upon the latter being brought together to compress the ring.

3. A gauge for piston rings comprising a stationary jaw, a movable jaw coacting therewith, said jaws having coacting recesses forming a seat, means for separating and closing the jaws, means to limit the last named movement, and means operated by the movable jaw to indicate the gauge of the ring.

4. A gauge for piston rings comprising a stationary jaw, a movable jaw coacting therewith having an operating arm, a seat to receive a piston ring, means connected with said arm for normally closing the jaws, means also connected with said arm for separating the jaws, a calibrated dial plate, and a pointer actuated upon the closing of the jaws to indicate on the dial plate the gauge of the ring held between the jaws.

5. A gauge for piston rings including a stationary jaw, a movable jaw coacting therewith having an operating arm, said jaws having mating recesses forming a ring-receiving seat, means connected with said arm for holding the movable jaw normally toward the stationary jaw, means also connected with said arm for moving the movable jaw away from the stationary jaw against the action of the last named means, a calibrated dial plate, a pointer pivotally mounted and coacting with the dial plate, and means to shift the pointer upon movement of the movable jaw toward the stationary jaw.

6. A gauge for piston rings including a stationary jaw, a movable jaw coacting therewith, said jaws having mating recesses forming a ring-receiving seat, means acting through intermediate connections for holding the movable jaw normally toward the stationary jaw, means acting through the same connections for moving the movable jaw away from the stationary jaw against the action of the last named means, a dial plate mounted over the movable jaw, a plate pivoted over the stationary jaw, a pointer carried by the pivoted plate, and operative connections between the movable jaw and the pointer for swinging the latter over the dial plate upon the movement of the movable jaw toward the stationary jaw to compress the ring and cause the ends thereof to move together, whereby to indicate the gauge of the ring in contracted size.

7. A gauge for piston rings including a stationary jaw, a movable jaw coacting therewith, said jaws having mating recesses forming a ring-receiving seat, means for operating a part for holding the movable jaw normally toward the stationary jaw, means for operating the same part for moving the movable jaw away from the stationary jaw against the action of the last named means, a calibrated dial plate mounted upon the one jaw, a pointer pivoted upon the other jaw, means normally holding the pointer in an inoperative position with respect to the dial plate, a link having pivotal connection with the pointer and guided in its movements, and means carried by the movable jaw to engage the link whereby to swing the pointer to indicating position over the dial plate.

8. A gauge for piston rings comprising in combination with a horizontal support, a stationary jaw mounted upon the support, a movable jaw pivoted upon the support, said jaws having a ring-receiving seat, a rocker arm pivoted on said support and connected with the movable jaw to operate the same, a weight acting to move said arm one way for holding the movable jaw toward the stationary jaw, foot operated means for moving the arm another way to operate the movable jaw away from the stationary jaw, and means actuated by movement of the movable jaw toward the stationary jaw to indicate the size of the ring held between the jaws.

9. A gauge for piston rings comprising in combination with a horizontal support, a stationary jaw mounted upon the support, a movable jaw pivoted upon the support, said jaws having a ring-receiving seat, means for closing and opening said jaws by operating said movable jaw, a dial, a pointer pivoted for movement over the dial, means to hold the pointer in an inoperative position, an arm operatively connected to the pointer and means carried by the movable jaw to engage the arm upon movement of the movable jaw toward the stationary jaw whereby the pointer will be moved into registering position with the dial.

10. In combination, a horizontal support having a slot, coacting jaws mounted upon the support, an arm projecting from one of the jaws and movable therewith, a shaft pivotally carried by the support and having an arm projecting through the slot for engagement with the arm of the jaw, pressure exerting means normally acting on the shaft to shift the movable jaw to clamping position, a foot treadle operatively connected to the shaft to turn the same against the action of the pressure exerting means to shift the movable jaw to an open position, a calibrated dial, a pointer pivotally mounted intermediately at one end and coacting with the dial at the other end, a spring normally holding the pointer in an inoperative position, an arm having pivotal connection with the pointer mounting and guided in its movements back and forth, and a contact member carried by the arm of the movable jaw to engage the last named arm to move the pointer into indicating position over the dial.

11. In combination, a horizontal support having a slot, a plate mounted upon the support, a stationary jaw mounted upon the plate, a movable jaw pivoted upon the plate and having a slotted arm extending over the slot, said jaws having coacting semi-circular recesses forming a circular seat for receiving a piston ring or the like, a shaft pivoted beneath the support and having an arm engaging the slot of the jaw arm, a weighted arm fixed to the shaft and normally moving the movable jaw toward the stationary jaw to compress a ring held in the seat, another arm fixed to the shaft, a foot treadle connected to the last named arm for operating the movable jaw with respect to the stationary jaw, means to limit the movement of the movable arm therefor to thereby limit the closing of the jaws, a calibrated dial plate mounted on the one jaw, a plate pivoted to the other jaw, a pointer adjustably mounted on the plate, means to move the pointer to an inoperative position upon movement of the movable jaw away from the stationary jaw, an arm pivoted to the plate and extending therefrom, means for guiding the said arm and an adjustable contact member carried by the jaw arm to engage the arm pivoted to the plate to cause the dial to indicate the gauge of the ring on the dial plate upon release of the foot treadle.

12. A gauge for use in testing annular objects such as piston rings comprising a support, gauging elements mounted on said support providing a recess for the reception of the annular objects, said support having a finger hole whereby access may be had to said recess from beneath said support to facilitate the removal of the annular objects therefrom, and means for indicating the gauge of the objects entered in said recess.

GEORGE H. HIGGINS.